(12) United States Patent
Lee

(10) Patent No.: US 10,831,795 B2
(45) Date of Patent: Nov. 10, 2020

(54) METHOD AND SYSTEM FOR PROVIDING TARGET INFORMATION USING APPLICATION LIST

(71) Applicant: NHN Entertainment Corporation, Seongnam-si (KR)

(72) Inventor: Joon ho Lee, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 161 days.

(21) Appl. No.: 15/480,831

(22) Filed: Apr. 6, 2017

(65) Prior Publication Data

US 2017/0293624 A1    Oct. 12, 2017

(30) Foreign Application Priority Data

Apr. 8, 2016    (KR) .................. 10-2016-0043665

(51) Int. Cl.
*G06F 17/00* (2019.01)
*G06F 16/332* (2019.01)
*G06F 16/84* (2019.01)
*G06F 16/335* (2019.01)
*H04L 29/08* (2006.01)

(52) U.S. Cl.
CPC ........ *G06F 16/3322* (2019.01); *G06F 16/335* (2019.01); *G06F 16/86* (2019.01); *H04L 67/306* (2013.01); *H04L 67/1097* (2013.01)

(58) Field of Classification Search
CPC .... G06F 16/3322; G06F 16/335; G06F 16/86; G06F 16/3325; G06F 16/35; G06F 16/9535; G06F 16/9536; G06F 9/44505; H04L 67/306; H04L 67/1097; G06Q 30/0267; G06Q 30/0271; G06Q 30/0251
See application file for complete search history.

(56) References Cited

U.S. PATENT DOCUMENTS

| 6,351,745 B1* | 2/2002 | Itakura .................. G06F 3/1423 |
| 9,616,830 B2* | 4/2017 | Rebholz .............. F02N 11/0866 |
| 2004/0177359 A1* | 9/2004 | Bauch ..................... H04L 29/06 719/313 |
| 2007/0073799 A1* | 3/2007 | Adjali ................... H04W 28/06 709/200 |

(Continued)

FOREIGN PATENT DOCUMENTS

| JP | 2007206876 | 8/2007 |
| JP | 5805294 | 11/2015 |

(Continued)

OTHER PUBLICATIONS

Japanese Office Action dated Apr. 9, 2019, issued in Japanese Patent Application No. 2017-064831.

(Continued)

*Primary Examiner* — Greta L Robinson
(74) *Attorney, Agent, or Firm* — H.C. Park & Associates, PLC

(57) ABSTRACT

A method and system for providing target information through an application list includes collecting user identifiers to identify each users and application lists of applications installed on terminals of the users; extracting text information using the application list for the user identifiers; and selecting a user identifier having text information corresponding to a keyword from among the user identifiers.

7 Claims, 8 Drawing Sheets

(56) References Cited

U.S. PATENT DOCUMENTS

| | | | |
|---|---|---|---|
| 2010/0306221 A1* | 12/2010 | Lokam | G06F 17/30631 |
| | | | 707/759 |
| 2011/0307354 A1 | 12/2011 | Erman et al. | |
| 2013/0159103 A1 | 6/2013 | Foroughi et al. | |
| 2013/0346450 A1* | 12/2013 | Procopio | G06F 21/6218 |
| | | | 707/783 |
| 2014/0040171 A1 | 2/2014 | Segalov et al. | |
| 2015/0052145 A1* | 2/2015 | Choi | H04L 67/1097 |
| | | | 707/740 |
| 2015/0254248 A1* | 9/2015 | Burns | G06F 16/24578 |
| | | | 707/749 |
| 2016/0148255 A1* | 5/2016 | Shariat | G06Q 30/0255 |
| | | | 705/14.53 |
| 2016/0180397 A1 | 6/2016 | Taki et al. | |
| 2017/0111226 A1* | 4/2017 | Zhou | H04L 41/0893 |

FOREIGN PATENT DOCUMENTS

| | | |
|---|---|---|
| KR | 10-2009-0033989 | 4/2009 |
| KR | 10-2014-0126865 | 3/2014 |
| KR | 10-1439928 | 12/2014 |
| KR | 10-2016-0017022 | 2/2016 |

OTHER PUBLICATIONS

Takeshi Takahashi et al., Studies on Risk Level Evaluation Schemes using APK Metadata, Computer Security 2015 (CD-ROM) , Japan, Oct. 14, 2015, pp. 199-206.

* cited by examiner

FIG. 4

| User identifier | Application list |
|---|---|
| aaaaa123-45b6-7c89 | WooriBank, DoodleDoodle, TicketMonster |
| 123abce1-fge4-h111 | TicketMonster, zigbang, coocha, DaumMap |
| 80zza111-a7n1-6b11 | Comico, coupang, CGV, DaumNews |
| aaaa0008-a56a-a111 | IBK, bdtong, TicketMonster, MBCmini, NaverWebtoon |
| ⋮ | ⋮ |

401 — User identifier
402 — Application list

FIG. 5

| Theme | Application list | | | | | | |
|---|---|---|---|---|---|---|---|
| Mobile finance | WooriBank | IBK | SmartLotte | KBkoominBank | HanaN Bank | ShinhanSbank | Mobile payment |
| Selfie | CandyCamera | B612 | PicsArt | Camera360 | 4sHared | PhoneThemeShop | InstaSize |
| Phone decoration | BuzzLauncher | DoodleDoodle | PhoneThemeShop | DodolLauncher | KakaoTalkThema | BuzzWidget | TheDayBefore |
| MS office | OneNote | OneDrive | ALYacAndroid | WhowhoSpam | MemoG | Excel | PowerPoint |
| Webtoon | NaverWebtoon | KakaoPage | DaumWebtoon | Comico | pikicast | LezhinComics | Everyone's webtoon |
| Shopping | CImall | GS shop | home&shopping | HyundaiHmall | LotteHomeShopping | TicketMonster | Gmarket |
| Game-casual | CandyCrushSoda | Anipang2 | AnipangSachunsung | CandyCrushSaga | Anipang | Shanghai/Anipang | DragonFlight |
| Social commerce | Coupang | Coocha | WeMakePrice | TicketMonster | Gmarket | Auction | NaverCafe |
| Instagram | Instagram | Daumcafe | B612 | Camera360 | Ndrive | Twitter | InstaSize |
| Part time work | Alba | JobKorea | NaverWebtoon | AfricaTV | AlabaMon | Alba-Friend | WorkNet |
| Travel | LotteDFS | StarBucksCard | CGV | ShillaDFS | KoreanAirline | korail | AsianaAirline |
| Date | Yanolja | CGV | GoodChoice | DailyHotel | NaverWebtoon | LotteCinema | Between |
| Delivery/zigbang | Beamin | Yogiyo | Coupang | Zigbang | Coocha | Yanolja | Bdtong |
| Language | DioDict3 Korean dictionary | DioDict3 English dictionary | VuRalkRemove | DioDict3 Japanese dictionary | DioDict3 Chinese dictionary | Flashlight | NaverMediaPlayer |
| Media | MBCmini | SBSgorilla | DaumNews | NaverMediaPlayer | DaumTVpot | DaumMap | my K |
| ... | ... | ... | ... | ... | ... | ... | ... |

FIG. 6

| User identifier | Application list | Text information |
|---|---|---|
| aaaaa123-45b6-7c89 | WooriBank, DoodleDoodle, TicketMonster | Mobile finance, phone decoration, social commerce |
| 123abce1-fge4-h111 | TicketMonster, zigbang, coocha, DaumMap | Social commerce, delivery/zigbang, Instagram, media |
| 80zza111-a7n1-6b11 | Comico, Coupang, CGV, DaumNews | Webtoon, social commerce, date, media |
| aaaa0008-a56a-a111 | IBK, bdtong, TicketMonster, MBCmini, NaverWebtoon | Mobile finance, delivery/zigbang, social commerce, media, webtoon |
| ... | ... | ... |

401 — 402 — 603

METHOD AND SYSTEM FOR PROVIDING TARGET INFORMATION USING APPLICATION LIST

CROSS-REFERENCE TO RELATED APPLICATION

This application claims priority from and the benefit of Korean Patent Application No. 10-2016-0043665, filed on Apr. 8, 2016, which is hereby incorporated by reference for all purposes as if fully set forth herein.

BACKGROUND

Field

Exemplary embodiments relate to technology for providing targeted information data.

Discussion of the Background

Beyond serving as a simple communication device, such as a mobile communication and communication over the wireless Internet, a mobile terminal, for example, a smartphone, a tablet, and a wearable computer, etc., has been increasingly developed to serve as various types of devices, such as, for example, a camera, a game, and a navigation device.

Such diversification of the mobile terminal is closely related to the development of multimedia technology. For example, the mobile terminal may be embedded with a timer to serve as an alarm watch. In addition, the mobile terminal may be used as a mobile video device and a mobile sound player by outputting a high quality video and a high quality audio. Also, the mobile terminal may be embedded with a global positioning system (GPS) to serve as a location guide device.

Meanwhile, a content providing model to insert a content object on a webpage is widely used as a method of making revenues using the webpage.

Currently, the use of the mobile terminal is on the increase and technology for serving content using the mobile terminal is in development. Thus, the content providing model is increasingly being used for mobile webpages.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a method and system that may provide target information using an application list of applications installed on a device of a user.

Exemplary embodiments also provide a method and system that may collect information about an application list for each user identifier and may extract a user identifier mapped to corresponding information for information targeting based on the collected information.

Additional aspects will be set forth in the detailed description which follows, and, in part, will be apparent from the disclosure, or may be learned by practice of the inventive concept.

According to exemplary embodiments, a method configured as a computer comprising a processor configured to execute computer-readable instructions, the method includes collecting user identifiers to identify individual users and application lists of applications installed on terminals of the users; extracting text information using the application list for the user identifiers; and selecting a user identifier having text information corresponding to a keyword from among the user identifiers.

Exemplary embodiments disclose a non-transitory computer-readable medium storing a computer program to perform a method in conjunction with a computer system including a processor configured to execute computer-readable instructions. The method includes collecting user identifiers to identify individual users and application lists of applications installed on terminals of the users; extracting text information using the application list for the user identifiers; and selecting a user identifier having text information corresponding to a keyword from among the user identifiers.

Exemplary embodiments disclose a system for providing target information, including: a processor configured with processor-executable instructions to perform operations collecting user identifiers to identify individual users and application lists of applications installed on terminals of the users (i.e., a collector); extracting text information using the application list for the user identifiers (i.e., an extractor); and selecting a user identifier having text information corresponding to a keyword from among the user identifiers (i.e., a selector).

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 4, FIG. 5, and FIG. 6 illustrate examples of a process of extracting text information from an application list according to an exemplary embodiment.

DETAILED DESCRIPTION OF THE ILLUSTRATED EMBODIMENTS

Figure 1:
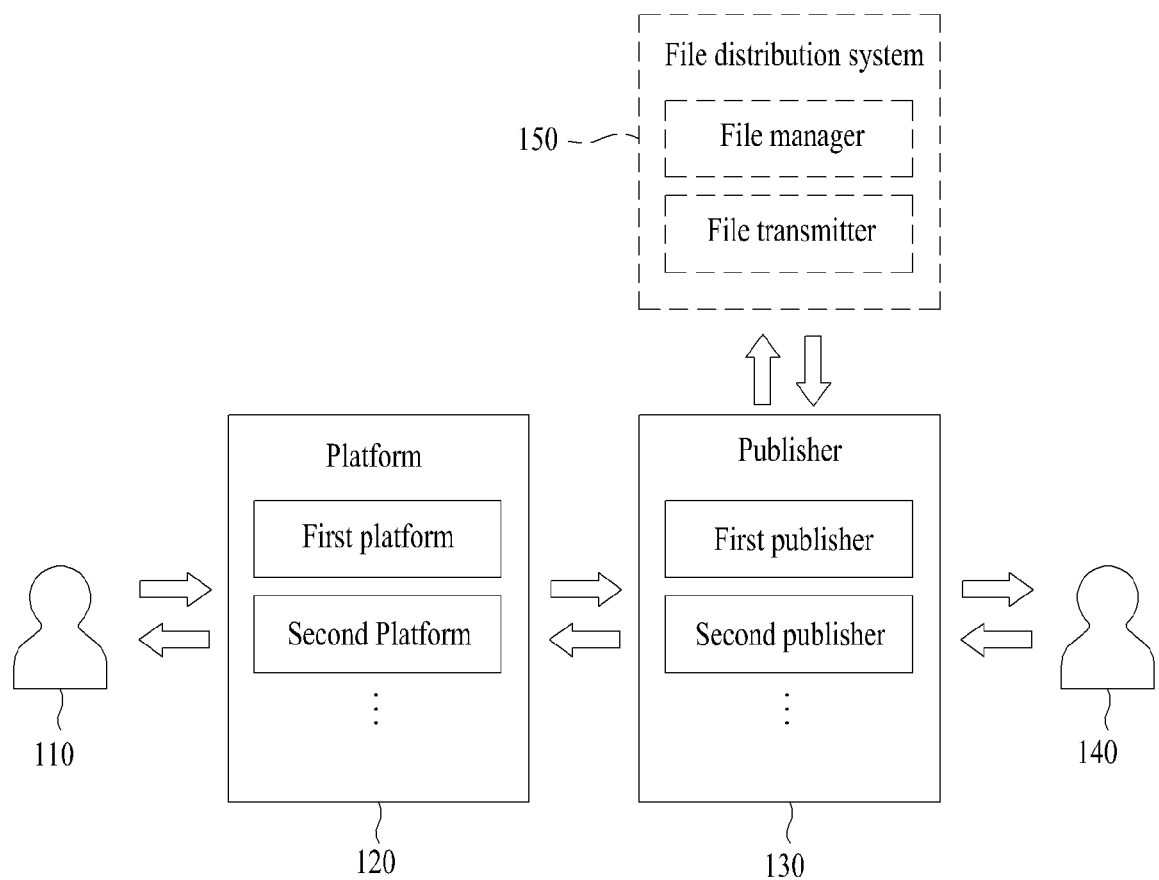
FIG. 1 illustrates an example of an information data providing environment according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Exemplary embodiments relate to method and system for providing targeted information data, and more particularly, to a method and system for extracting a target for providing information data through an application installation list.

FIG. 1 illustrates an example of an information data providing environment according to an exemplary embodiment. FIG. 1 illustrates an information provider 110, a platform 120, a publisher 130, and a user 140. The information provider 110 and the user 140 may indicate a terminal, such as a personal computer (PC), a smartphone, etc., used by the information provider 110 or the user 140. Referring to FIG. 1, indicators with arrow heads between the information provider 110, the platform 120, the publisher 130, and the user 140 may indicate that data may be transmitted and received among a terminal used by the information provider 110, the platform 120, the publisher 130, and a terminal used by the user 140 over a wired/wireless network.

The platform 120 may refer to a system that may make bids for content provided as information data of the information provider 110, match targeting elements associated with a user to the content that is to be provided, sort contents, provide content to the publisher 130, charge the information provider 110 for displaying content, etc.

The term "publisher" used herein may be interchangeably used with the term "site". However, a description using the term "site" does not exclude a probability of implementing the disclosure in an environment, aside from a connection from a general PC to a website, such as a screen of an application executed on a mobile terminal. The term "site" may be interchangeably used with the term "publishing site" or "publisher". That is, the respective sites may correspond to individual publishers, for example, a first publisher, a second publisher, . . . , included in the publisher 130. Each of the individual publishers may be configured using one or more publisher servers. Here, the term "site" may include any type of websites capable of displaying contents and being provided to the user 140 over a wired network or a wireless network, and may indicate a single webpage that constitutes a website.

Also, the term "displaying" content used herein may be interpreted to include that promoting content associated with the information provider 110, for example, providing information data to a visitor of a corresponding site through the publisher 130.

The publisher 130 may receive contents to be provided through a site of the publisher 130 from the platform 120 and may provide the received contents to the user 140. For example, the publisher 130 may receive information data to which the user 140 is a target from the platform 120 and may provide the information data to the user 140.

The publisher 130 may provide a route through which the user 140 directly receives content. Generally, in an online environment, contents may be provided through a website/mobile site. Here, each of a plurality of individual platforms, for example, a first platform, a second platform, . . . , included in the platform 120 may display content through at least one of the plurality of individual publishers, for example, the first publisher, the second publisher, . . . , included in the publisher 130. Here, each of the individual platforms may be configured using one or more platform servers. However, exemplary embodiments of the inventive concept are not limited thereto.

In FIG. 1, a file distribution system 150 may be selectively used. For example, when the user 140 uses a mobile terminal, the file distribution system 150 may provide the user 140 with a file for installing an application associated with the publisher 130 on the mobile terminal. The file distribution system 150 may include a file manager configured to store and maintain the aforementioned file and a file transmitter configured to transmit the file to the mobile terminal in response to a request from the mobile terminal of the user 140. The application may be installed on the mobile terminal using the transmitted file. The application may control the mobile terminal to perform operations of providing information data according to exemplary embodiments.

The exemplary embodiments may apply the information data providing environment of FIG. 1. A provider of the platform 120 may design the platform 120 so that the information provider 110 may select basic cost per traffic, for example, a bidding price, etc., for information data that is content of the information provider 110, a running time, and a targeting element, for example, a region, a time, weather, a category, etc., associated with a user to which the information data is to be provided, etc. Accordingly, the information provider 110 may upload information data to the platform 120 and may register content of the information provider 110 to the platform 120 by paying cost based on, for example, a running time and a target time, or by bidding, but the inventive concept is not limited thereto.

The publisher 130 may receive information data in which the user 140 is a target through the platform 120 and may provide the received information data to the user 140, and may share revenues coming from providing of the information data with a platform provider. For example, the publisher 130 may indicate a site, an application, etc., of a company that provides a variety of contents, for example, advertisements, videos, news, webtoons, shopping information, etc. The publisher 130 may include any type of media that provides contents to the user 140 and make revenues through providing the contents.

A program associated with the publisher 130 may be installed on a terminal used by the user 140. For example, the program may be installed on the terminal of the user 140 in a form of an application or a plug-in form, and may control the terminal of the user 140 or a web browser installed on the terminal of the user 140 to output information provided from the publisher 130.

Hereinafter, an information providing system and an information providing method according to exemplary embodiments will be described.

Figure 2:
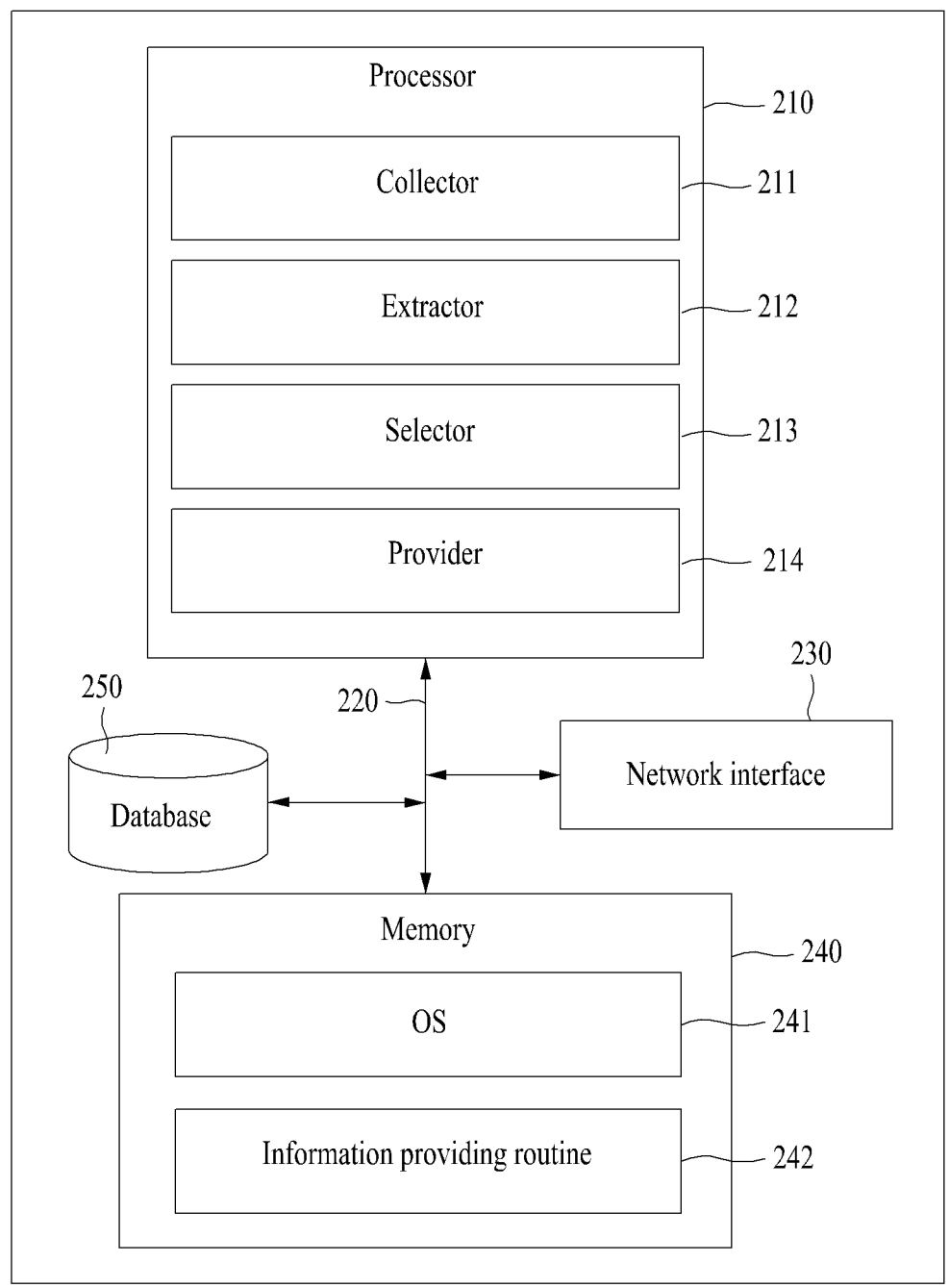
FIG. 2 illustrates an example of a configuration of an information providing system according to an exemplary embodiment.
Figure 3:
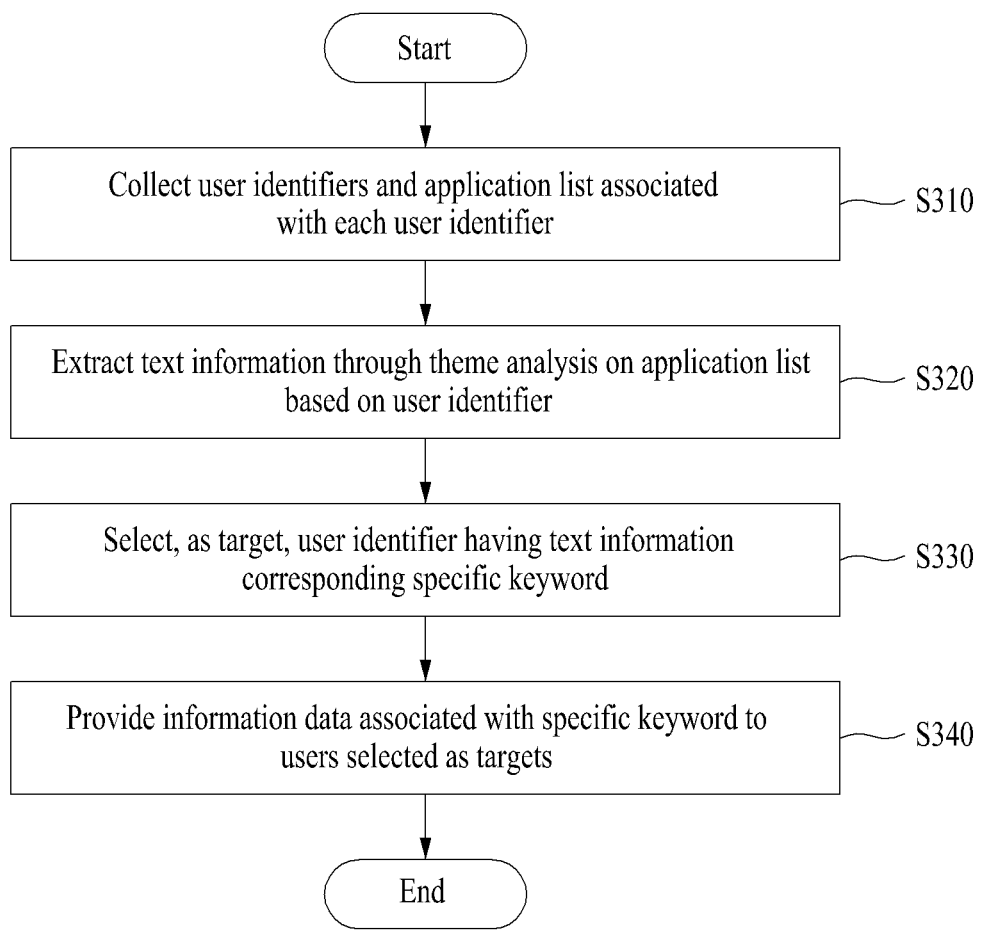
FIG. 3 is a flowchart illustrating an information providing method according to an exemplary embodiment.

FIG. 2 illustrates an example of a configuration of an information providing system according to an exemplary embodiment, and FIG. 3 is a flowchart illustrating an information providing method according to an exemplary embodiment.

An information providing system 200 disclosed herein may be a computer system that constitutes a single platform among a plurality of individual platforms described in FIG. 1.

The information providing system 200 may include, for example, a processor 210, a bus 220, a network interface 230, a memory 240, and a database 250. The memory 240 may include an operating system (OS) 241 and an information providing routine 242. The processor 210 may execute instructions to provide the functions of a collector 211, an extractor 212, a selector 213, and a provider 214. According to exemplary embodiments, the information providing system 200 may include a greater or less number of components than that the components shown in FIG. 2.

The memory 240 may include a permanent mass storage device such as random access memory (RAM), read only memory (ROM), and a disk drive as a non-transitory computer-readable recording medium for storing executable instructions. A program code for the OS 241 and the information providing routine 242 may also be stored on the memory 240. Software components may be loaded to the memory 240 through another computer-readable recording medium separate from the memory 240 using a drive mechanism (not shown). The other computer-readable recording medium may include, for example, a floppy drive, a disk, a tape, a DVD/CD-ROM drive, a memory card, etc. According to exemplary embodiments, software components may be loaded to the memory 240 through the network interface 230 instead of, or in addition to, the computer-readable recording medium.

The bus 220 enables communication and data transmission between the components of the information providing system 200. The bus 220 may be configured using a high-speed serial bus, a parallel bus, a storage area network (SAN) and/or other appropriate communication technologies.

The network interface 230 may be a computer hardware component for connecting the information providing system 200 to a computer network. The network interface 230 may connect the information providing system 200 to the computer network through a wireless connection or a wired connection.

The database 250 serves to store and maintain information data that is content registered by the information provider 110. The information data may include videos, voice, images, texts, etc., and may inclusively indicate a variety of information that are created and distributed in a digital format or the contents thereof. Although FIG. 2 illustrates that the database 250 is included in the information providing system 200, it is provided as an example only. The entire database or a portion of the database may be present as an external database constructed on a separate system depending on a service configuration scheme or an environment, etc.

The processor 210 may be configured to process computer-readable instructions by performing basic arithmetic operations, logic operations, and input/output (I/O) operations of the information providing system 200. The computer-readable instructions may be provided from the memory 240 or the network interface 230 to the processor 210 through the bus 220. The collector 211, the extractor 212, the selector 213, and the provider 214 included in the processor 210 may be configured to perform operations S310 through S340 of FIG. 3 by executing the program code loaded to the memory 240. The program code may be loaded from a program file to a recording device such as the memory 240.

In operation S310 in FIG. 3, the collector 211 may collect user identifiers each to identify a user and application list information associated with a corresponding identifier. The user identifier may indicate an ID assigned from the information providing system 200 to identify or specify the user, instead of indicating personal information of the user. The user identifier may be created for each terminal used by the user, and may be initialized, reset, etc., in response to a request from the user. For example, the information providing system 200 may assign a user identifier for each user, and may use the user identifier to create a profile of the user or to provide interest-based information data. The collector 211 may collect application list information associated with applications installed on a terminal, for example, a PC, a smartphone, etc., used by the user for each user based on the user identifier. For example, the collector 211 may collect application list information of the user through a specific application, for example, a secure application of providing a cheat tool detection, a decompile prevention, a file integrity verification, etc., which is installed on the terminal, such as a PC, a smartphone, etc., used by the user and interacts with the information providing system 200. The collected application list information may be classified and managed based on the user identifier. The application list information may include additional explanation information, for example, a category, a main keyword, etc., for each application.

In operation S320, the extractor 212 may extract text information through a theme analysis on an application list based on the user identifier. For example, the extractor 212 may extract text information by analyzing a theme for each of the applications included in the application list, for each user identifier. For example, the extractor 212 may extract a main word through an application-by-application theme analysis using a latent Dirichlet allocation (LDA) analysis scheme. The extractor 212 may extract text information for each user identifier based on application list information. For example, text information may be present for each user identifier and the text information for each user identifier may be stored and managed in the database 250.

In operation S330, the selector 213 may select, as a target, a user identifier having text information corresponding to a specific keyword. For example, the text information for each user identifier may be used to predict a target of interest in association with information to be marketed and to select the predicted target of interest as a target. The selector 213 may apply a search flow to the text information for each user identifier, may extract a user identifier mapped to a specific keyword in response to conducting a search using the specific keyword, and may select a target corresponding to the specific keyword.

In operation S340, the provider 214 may provide information data associated with the specific keyword as target information to users selected as the targets. For example, the provider 214 may target a user identifier having the specific keyword among the user identifiers based on the text information for each user identifier and may provide marketing information associated with the specific keyword. The provider 214 may map the user identifier for identifying a user on a mobile application and identification information, for example, a cookie, a log-in ID, etc., for identifying the user on a website, and may apply a targeting element common between the mobile application and the website based on the mapped information. For example, in response to switching from the mobile application to the website, it is possible to track the user using a cookie that is mapped to the user identifier and perform retargeting associated with the user.

Hereinafter, an example of a process of extracting text information from an application list will be described. FIGS. 4, 5, and 6 illustrate examples of a process of extracting text information from an application list according to exemplary embodiments.

Referring to FIG. 4, the collector 211 may collect user identifiers 401 for identifying a user, and may collect an application list 402 of applications installed on the terminal of the user corresponding to the user identifier 401. For example, in the case of user identifier "aaaaa123-45b6-7c89", applications "WooriBank", "DoodleDoodle", and "TicketMonster" may be installed on a terminal of a user corresponding to the user identifier "aaaaa123-45b6-7c89".

A theme may be analyzed for each application based on additional explanation information of each application. FIG. 5 illustrates an example of theme analysis result data of the applications. For example, applications "WooriBank", "IBK", "SmartLotte", "KBkookminBank", etc., may be classified into a common category "mobile finance". Also, applications "BuzzLauncher", "DoodleDoodle", "PhoneThemeShop", etc., may be classified into a common category "phone decoration". Similarly, applications "coupang", "coocha", "WeMakePrice", "TicketMonster", etc., may be classified into a common category "social commerce". Accordingly, as further illustrated in FIG. 6, text information, for example, mobile finance, phone decoration, social commerce, etc., of a corresponding application may be acquired from a theme analysis result. Accordingly, the extractor 212 may analyze a theme for each application based on additional explanation information of the application, and accordingly, may extract text information corresponding to each application.

Referring to FIG. 6, the extractor 212 may extract text information 603 by analyzing a theme for each of applications included in the application list 402 based on the user identifier 401. The text information 603 may be extracted from the application list 402 of applications installed on a user terminal, and may correspond to an analysis result of the interest of the user. For example, in the case of user identifier "aaaaa123-45b6-7c89", applications "WooriBank", "DoodleDoodle", and "TicketMonster" may be installed on the terminal of the corresponding user, and text information "mobile finance", "phone decoration", and "social commerce" may be extracted from a theme analysis result for each installed application. Accordingly, the extractor 212 may extract the text information 603 based on application list information for each user identifier 401, and accordingly, may have the text information 603 based on the user identifier 401.

Figure 7:
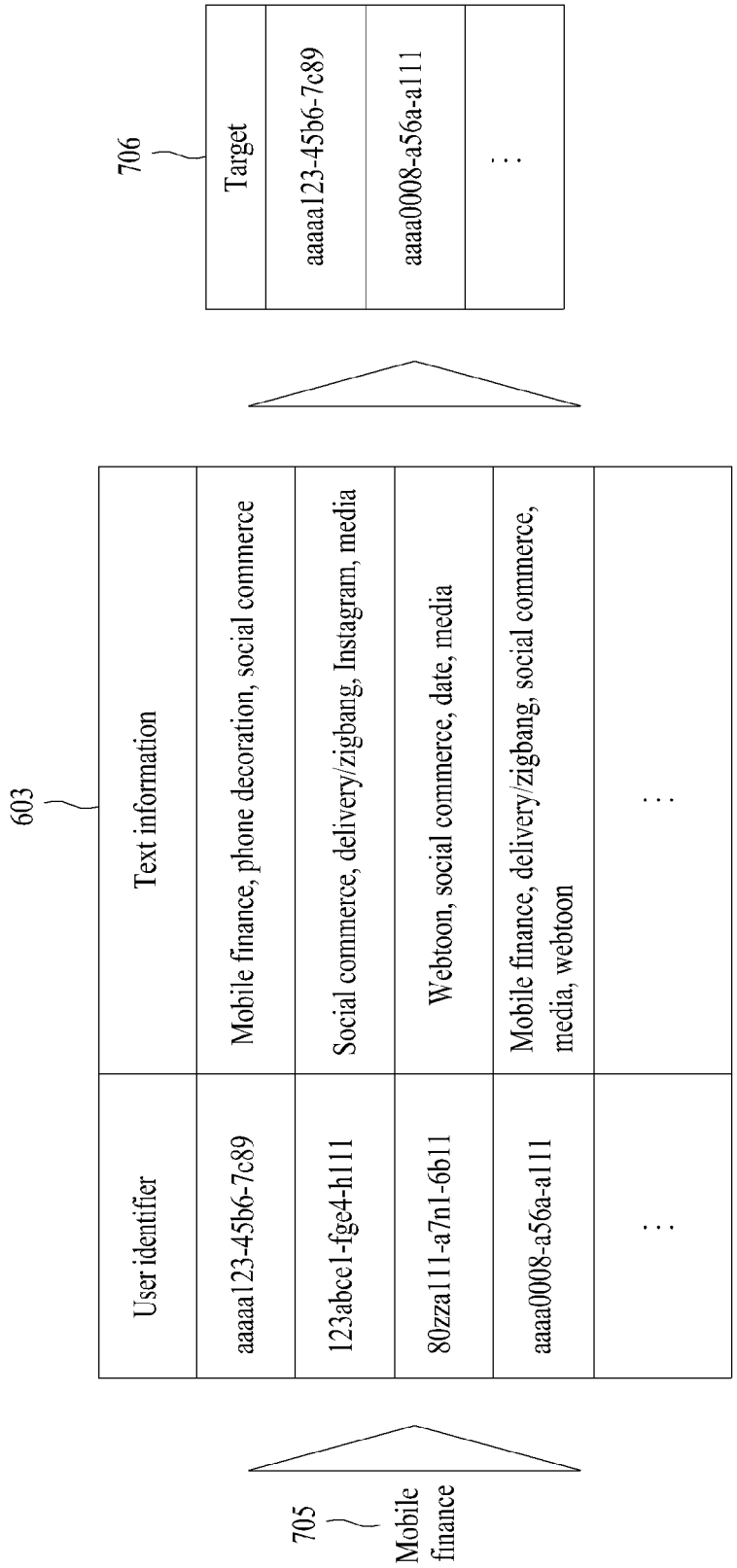
FIG. 7 illustrates an example of a process of extracting a user identifier mapped to a specific keyword according to an exemplary embodiment.

FIG. 7 illustrates an example of a process of extracting a user identifier mapped to a specific keyword according to an exemplary embodiment.

The selector 213 may apply a search flow to text information for each user identifier, may extract a user identifier mapped to a specific keyword in response to conducting a search using the specific keyword, and may select targets corresponding to the specific keyword. For example, referring to FIG. 7, if a product to be promoted by a marketer is related to "mobile finance", "mobile finance" may be used as a search keyword 705 associated with the text information 603 for each user identifier. Here, a user identifier mapped to the search keyword 705, that is, a user identifier having "mobile finance" in the text information 603 may be selected and may be selected as a target 706 corresponding to the product associated with "mobile finance".

According to exemplary embodiments, it is possible to collect user identifiers and a list of applications installed in each terminal of a user corresponding to a user identifier, and to extract text information representing a user's interest from an application list for each user identifier. Further, it is possible to select user identifiers having text information corresponding to a specific keyword from among user identifiers based on text information for each user identifier, and to use the selected user identifiers as targets corresponding to information data associated with the specific keyword.

Figure 8:
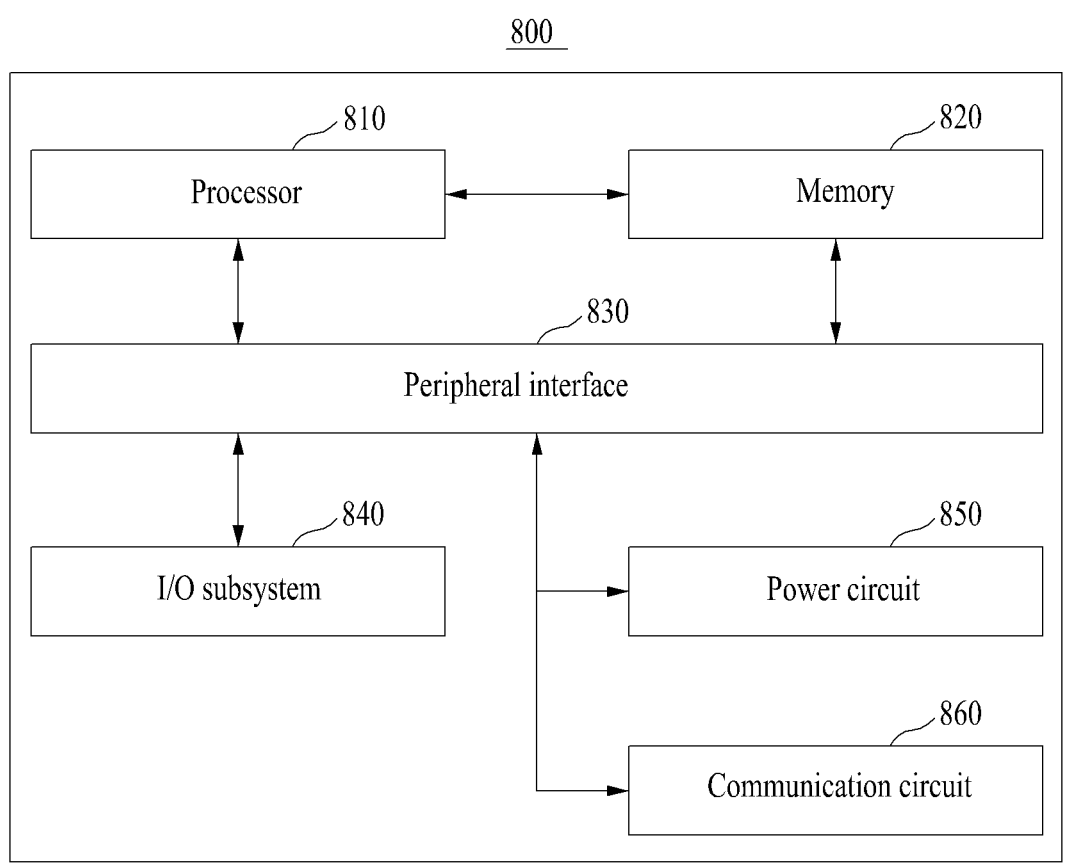
FIG. 8 illustrates an example of a configuration of a computer system according to an exemplary embodiment for practicing the inventive concepts.

FIG. 8 illustrates an example of a configuration of a computer system according to an exemplary embodiment. Referring to FIG. 8, a computer system 800 may include at least one processor 810, a memory 820, a peripheral interface 830, an I/O subsystem 840, a power circuit 850, and a communication circuit 860. The computer system 800 may correspond to a user terminal.

The memory 820 may include, for example, a high-speed random access memory (HSRAM), a magnetic disk, a static random access memory (SRAM), a dynamic RAM (DRAM), read only memory (ROM), a flash memory, or a non-volatile memory. The memory 820 may include a software module, an instruction set, or a variety of data required for an operation of the computer system 800. Access from another component, such as the processor 810 and the peripheral interface 830, to the memory 820 may be controlled by the processor 810.

The peripheral interface 830 may couple an input device and/or an output device of the computer system 800 with the processor 810 and the memory 820. The processor 810 may perform a variety of operations for the computer system 800 and process data by executing the software module or the instruction set stored in the memory 820.

The I/O subsystem 840 may couple various I/O peripheral devices with the peripheral interface 830. For example, the I/O subsystem 840 may include a controller for coupling the peripheral interface 830 and a peripheral device, such as a monitor, a keyboard, a mouse, a printer, and a touch screen or a sensor depending on a necessity. The I/O peripheral devices may be coupled with the peripheral interface 830 without using the I/O subsystem 840.

The power circuit 850 may supply power to all of or a portion of components of a terminal. For example, the power circuit 850 may include a power management system, at least one power source such as a battery and alternating circuit (AC), a charge system, a power failure detection circuit, a power converter or inverter, a power status indicator, or other components for creating, managing and distributing the power.

The communication circuit 860 enables communication with another computer system using at least one external port. Alternatively, as described above, the communication circuit 860 may enable communication with another computer system by including a radio frequency (RF) circuit and thereby transmitting and receiving an RF signal known as an electromagnetic signal.

The exemplary embodiment of FIG. 8 is only an example of the computer system 800. The computer system 800 may have a configuration or an arrangement for omitting a portion of the components illustrated in FIG. 8, further including components not illustrated in FIG. 8, or coupling two or more components. For example, a computer system for a communication terminal of a mobile environment may further include a touch screen, a sensor, etc., in addition to the components of FIG. 8. A circuit for RF communication using a variety of communication methods, for example, wireless fidelity (WiFi), 3rd generation (3G), long term evolution (LTE), Bluetooth, near field communication (NFC), ZigBee, etc., may be included in the communication circuit 860. Components includable in the computer system 800 may be configured as hardware that includes an integrated circuit specified for at least one signal processing or application, software, or a combination of hardware and software.

The methods according to the exemplary embodiments may be configured in a form of a program instruction executable through a variety of computer systems and may be recorded in a non-transitory computer-readable medium.

According to exemplary embodiments, it is possible to further more quickly and effectively secure a target corresponding to information data by collecting information about an application list for each user identifier and by extracting a user identifier mapped to the information data based on the collected information. That is, it is possible to collect text information representing a field of interest of a user using the application list based on a user identifier, and to extract user identifiers mapped to the information data at a time based on the collected text information. Accordingly, instead of selecting and providing a mapping advertisement for each individual user, it is possible to deploy an information provider-centric marketing by providing a targeted marketing environment in which a marketing target is secured.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method performed at a computer comprising a processor configured to execute computer-readable instructions, the method comprising:
    collecting user identifiers to identify individual users of associated terminals;
    collecting application lists of applications currently installed on each of the associated terminals of the individual users via a specific application executing on the associated terminals, the specific application being a secure application providing the associated terminals with at least one of a cheat tool detection function, a decompile prevention function, and a file integrity verification function, the application lists including additional explanation information for each application;
    extracting text information from the application lists by analyzing and determining a theme for the applications of the application lists with regard to each of the user identifiers, the text information including a plurality of keywords extracted based on determined themes for the applications of the application lists;
    selecting user identifiers having text information corresponding to a keyword from among the user identifiers as targets for providing information data in a lump; and
    providing the information data associated with the keyword to the user identifiers selected as the targets.

2. The method of claim 1, wherein the information data is associated with the keyword.

3. The method of claim 1, further comprising:
    mapping the user identifier to identify the user on a mobile application and identification information to identify the user on a website; and
    performing retargeting associated with the user based on the mapped information in response to switching between the mobile application and the website.

4. A non-transitory computer-readable medium storing a computer program to perform a method in conjunction with a computer system, wherein the method comprises:
    collecting user identifiers to identify individual users of associated terminals;
    collecting application lists of applications currently installed on each of the associated terminals of the individual users via a specific application executing on the associated terminals, the specific application being a secure application providing the associated terminals with at least one of a cheat tool detection function, a decompile prevention function, and a file integrity verification function, the application lists including additional explanation information for each application;
    extracting text information from the application lists by analyzing and determining a theme for the applications of the application lists with regard to each of the user identifiers, the text information including a plurality of keywords extracted based on determined themes for the application of the application lists;
    selecting user identifier having text information corresponding to a keyword from among the user identifiers as targets for providing information data in a lump; and
    providing the information data associated with the keyword to the user identifiers selected as the targets.

5. A system for providing target information, comprising:
    a processor configured with processor-executable instructions to perform operations comprising:
    collecting user identifiers to identify individual users of associated terminals;
    collecting application lists of applications currently installed on each of the associated terminals of the individual users via a specific application executing on the associated terminals, the specific application being a secure application providing the associated terminals with at least one of a cheat tool detection function, a decompile prevention function, and file integrity verification function;
    extracting text information from the application lists by analyzing and determining a theme for the applications of the application lists with regard to each of the user identifiers, the text information including a plurality of keywords extracted based on determined themes for the applications of the application lists;
    selecting user identifiers having text information corresponding to a keyword from among the user identifiers as targets for providing information data in a lump; and
    providing the information data associated with the keyword to the user identifiers selected as the targets.

6. The system of claim 5, wherein the information data is associated with the keyword.

7. The system of claim 5, wherein the processor is further configured to:
    map the user identifier to identify the user on a mobile application and identification information to identify the user on a website, and
    perform retargeting associated with the user based on the mapped information in response to switching between the mobile application and the website.

* * * * *